Oct. 30, 1928.
W. F. GRUPE
1,689,584
METHOD OF MOLDING COMPOSITE CORK BODIES
Filed Aug. 10, 1923    2 Sheets-Sheet 1
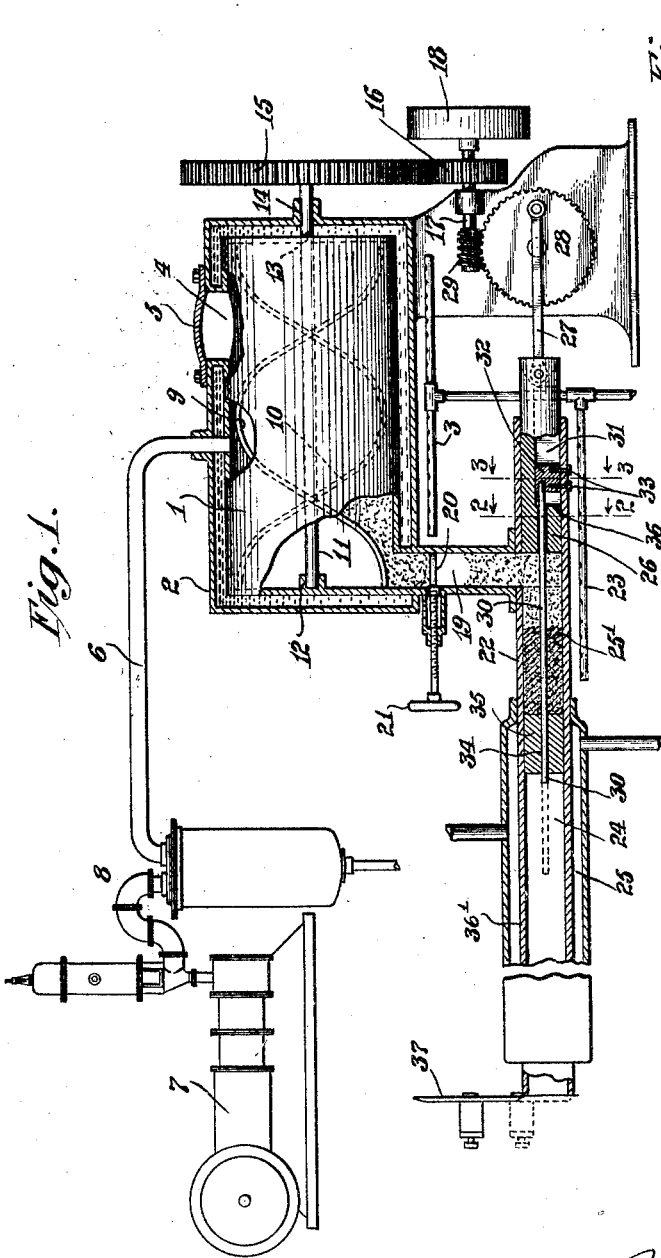
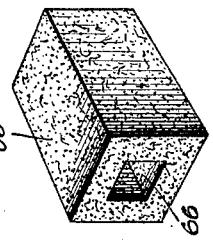
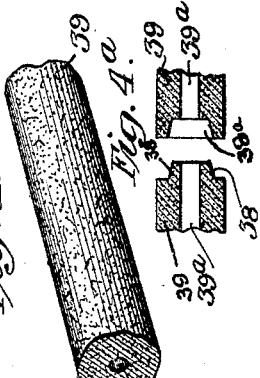
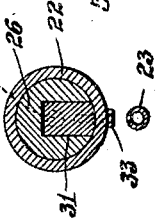
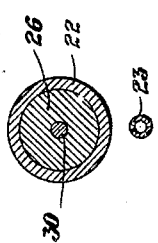
INVENTOR,
William F. Grupe,
BY Henry J. Lucke,
his ATTORNEY.

Oct. 30, 1928.
W. F. GRUPE
1,689,584
METHOD OF MOLDING COMPOSITE CORK BODIES
Filed Aug. 10, 1923   2 Sheets-Sheet 2
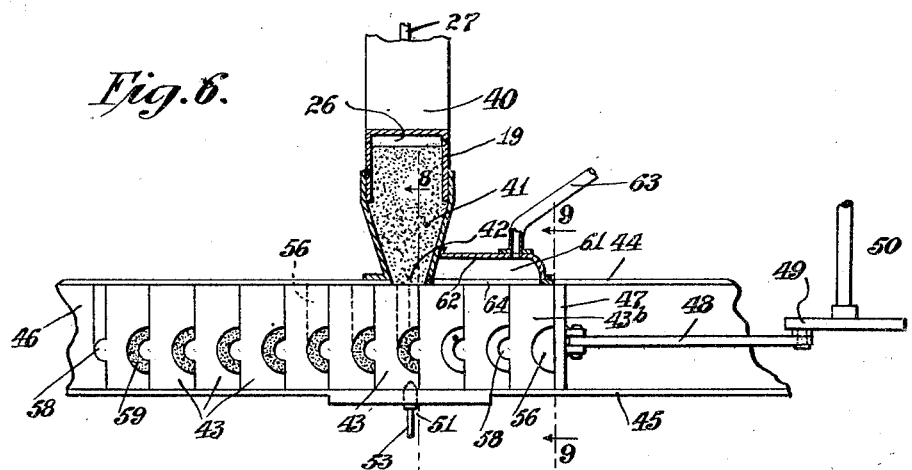
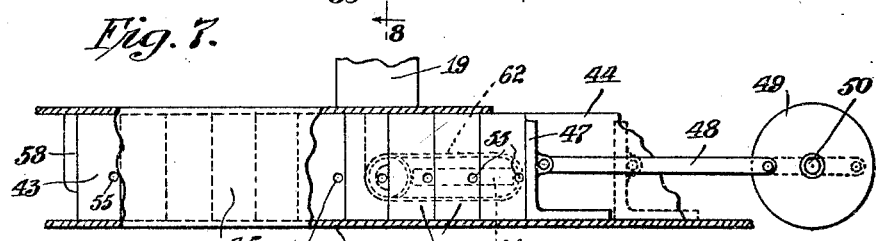
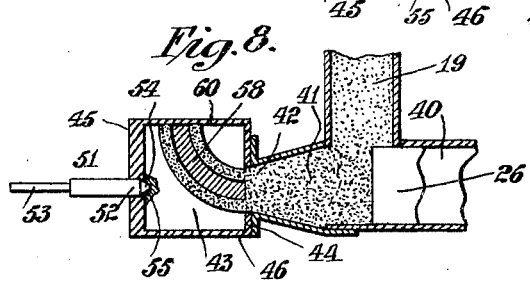
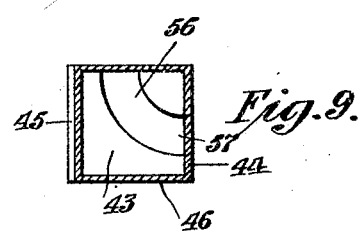
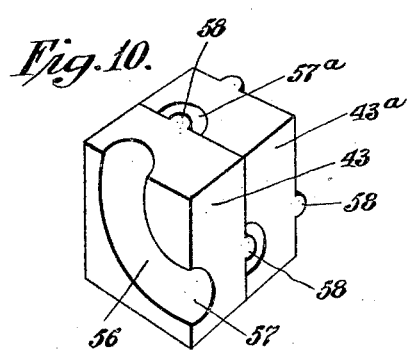
INVENTOR,
William F. Grupe,
BY
Henry J. Lucke,
ATTORNEY.

Patented Oct. 30, 1928.

1,689,584

UNITED STATES PATENT OFFICE.

WILLIAM F. GRUPE, OF LYNDHURST, NEW JERSEY, ASSIGNOR TO BOUCHER CORK COMPANY, OF NEW YORK, N. Y., A CORPORATION OF NEW YORK.

METHOD OF MOLDING COMPOSITE-CORK BODIES.

Application filed August 10, 1923. Serial No. 656,744.

This invention relates to molded cork and the method of producing the same.

Heretofore, it has been proposed to compress within molds granulated cork or other particles of cork waste and subject such molds in ovens to elevated temperature to approximately 600° F. to form products having the shape of the molds. However, in such procedure, the cork mold is open to the air and at pressures at or exceeding atmospheric pressure, thereby permitting partial combustion to take place, resulting in charring and other breakdown of the cork cells and rendering the cork brittle and of reduced insulating quality.

Pursuant to the present invention, the granulated natural cork or like cork waste is raised in temperature to approximately 350° F., but under a vacuum to provide a pressure considerably lower than atmospheric pressure and to remove substantially all air or other oxygen-containing gas from contact with the cork. Under such conditions of operation, the temperature of the heating medium applied exteriorly of the container enclosing the cork is approximately 350° F. which may be readily furnished by flames of ordinary so-called city gas. Upon attaining such temperature and reduced pressure throughout the cork particles, I have discovered that the natural resins normally present within the cells of the cork exude through the walls of the cells and in the absence of air or other oxygen-containing gas the cork resolves into a pasty mass without any substantial chemical decomposition or carbonization and with a minimum loss of natural resins. Pursuant to my invention, in the event of greater loss of natural resins or insufficient presence of natural resins in the cork, the desired proportion of resin in the resulting product is secured by charging resin during the operation. Similarly, other binders such as casein may be added for the particular purposes of the final product.

The resulting mass may be transferred by suitable means, under vacuum conditions, to molds for shaping the mass to the desired forms and upon cooling and exposure to ordinary atmosphere, the material of the molded product closely resembles natural cork in its well known characteristics of appearance, life and resiliency, also in high resistance to conductivity of heat and cold, in high electrical resistance and in the property of repelling moisture, water or like liquids. The resulting product is superior to natural cork in that it is of uniform structure and with the absence of pores.

Other features and objects of the invention will be more readily understood from the following detail description and the accompanying drawings, in which Fig. 1 illustrates diagrammatically a drum for receiving the cork particles, a continuously acting pump and a condenser for creating a vacuum within the drum and for withdrawing moisture and any oxygen-containing gases from the interior of the drum; means for withdrawing the heated mass from the drum into a mold, also mechanism for continuously compacting the heated mass in such mold and suitable heating means for the drum, the withdrawing means and for the mold.

Fig. 2 is a cross-sectional view of the plunger on line 2—2 of Fig. 1;

Fig. 3 is a similar cross-sectional view on line 3—3 of Fig. 1;

Fig. 4 is a perspective view of a product in the form of a pipe or round tube;

Fig. 4ª is a detail view of a pair of interlocking pipes;

Fig. 5 is a perspective view of a square tube suitable for hollow block construction, for walls and like uses;

Fig. 6 is a detail top plan view of the individual molds and discharge from the drum for charging the molds;

Fig. 7 is a front vertical elevation of the molds of Fig. 6; this figure also shows its front portion broken away to bring to view otherwise hidden parts;

Fig. 8 is a sectional view on line 8—8 of Fig. 6;

Fig. 9 is a sectional view on line 9—9 of Fig. 6;

Fig. 10 is a detail perspective view of individual molds for elbows; and

Fig. 11 is a front elevational view of a molded half of a cork elbow.

Referring to the drawings, the drum 1 is shown as cylindrical in outline and provided with a jacket 2 encircling the cylindrical face and the opposite flat end faces of the drum, for receiving a suitable heating fluid such as oils resisting decomposition at the maximum temperature of operation.

The heating fluid is elevated in temperature by means of the burners 3 which may be located closely adjacent the drum, or the fluid may be heated in a boiler at a distance from the drum and suitably connected with the jacket 2.

Under a suitably low vacuum, such as approximately within the range of from 25 to 29 inches of mercury column, and a heating temperature of approximately 350° F. for the heating fluid, the cork is raised to a temperature equivalent to approximately 600° F. under normal atmospheric conditions for cork of certain water content; upon further reduction of the temperature and "increase" of vacuum the mass is rendered plastic and the plasticity and elasticity of the resins as well as their binding qualities are maintained at maximum.

The cork is charged into the drum through the opening 4, which is provided with the closure 5, sealed by clamps or other suitable means.

Leading from the interior of the drum 1 is the pipe 6 connected to the condenser 8 and pump 7 for the purpose of condensing the vaporized contents of the cork mass.

Preferably, the drum 1 is equipped with a stirrer, such as the spaced spiral arms 9, 10 mounted on the central shaft 11 journaled at one end 12 interiorly of the drum 1 and at the other end passing through the sealed bearing openings 13, 14 such as stuffing boxes or other approved means. The gear 15 is keyed to the shaft 11, and meshes with the driving gear 16, keyed to the shaft 17, carrying the driving pulley 18, for receiving a belt or otherwise driven by suitable driving means.

At a suitable location in the wall of the drum 1, is arranged the discharge passage 19, having a gate 20, operated by the handle 21. The discharge pipe 19 extends preferably downwardly to communicate with the mold.

The mold may comprise an interior section 22, subjected to heat furnished by the series of burners 23 or by means of a heating fluid, as aforesaid, and comprising also a posterior section 24 provided with the jacket 25 for reducing the temperature of the mold section 24.

In advance of the mold section 22 is arranged the passage 25', enclosing the plunger 26 for advancing and compacting the mass in the mold section 22 upon discharge from the passage 19. The plunger 26 is reciprocated by the pitman 27, eccentrically pivoted to the gear 28, driven by the worm 29, from the driving shaft 17, or suitable equivalent means.

In Fig. 7, the mold is illustrated for the production of pipe or round tube 39 and for such product, see Fig. 4, the central opening 39ª is determined by the round rod 30 serving as a core. The rod 30 is centered at its rearward end with the opening 31 passing through the plunger 26, and anchored in the block 32, secured within the passage 25' by means of the set screws 33, 33, see also Fig. 3. The forward end of the rod 30 is loosely received within the perforation 34 in the sealing plug 35. The plunger 26 is cut away as indicated at 36 for a distance corresponding to the stroke of the plunger 26 under reciprocation by the pitman 27.

The plug 35 serves as a seal within the mold until the mold has become automatically sealed by the molded cork mass injected therein by the plunger 26, and for such purpose the plug 35 closely fits the inner face of the anterior mold section 22 and the posterior mold section 24. For the successive positions of the sealing plug 35, it serves as an abutment for the mass of molded cork which is subjected to repeated impacting by the plunger 26, and upon accretions of plastic cork added upon discharge through the pipe 19 upon successive withdrawals of the plunger 26, the increasing, compacted molded mass causes the sealing plug 35 to gradually advance along the mold sections 22, 24, until the plug 35 reaches the final mold 36', having an enlarged diameter as compared with the diameter of the mold section 24.

The final mold section 36' may be of slight outward taper or gradually enlarged in cross-section to reduce the wall friction of the molded cork mass while the molded cork mass is being transmitted through the final mold section 36.

It will be observed that as the plastic mass is compacted within the mold in more or less solid form, it is automatically removed from the effect of the vacuum created by the pump 7 and its temperature effectually reduced from the equivalent temperature of 600° F. under the vacuum to a temperature of approximately 350° F. at a pressure approximating one atmosphere whereby the molded cork mass is automatically reduced in temperature without exposure to the air.

The cooling jacket 25 produces a further reduction in actual temperature of the molded cork product to enable the product to be cut, as by the rotary knife 37, in the open air without substantial change in the cork mass.

The resulting cork product has the form of the mold 22, 24 and is comprised of portions bound to one another by the self-contained resins. The cork product is free from pores such as is present in natural cork.

The cork product possesses the advantageous features of natural cork of resiliency, of the capability of being reduced in volume under pressure and automatically restoring itself to original volume upon release of pressure.

The product in the form of a "pipe" or round tube 39 is eminently adapted as an insulator for refrigerating systems, as by slipping such tubes over the pipes. The round tube 39 of molded cork may itself be employed as the pipe.

To further insure insulation at the joints of the successive molded cork pipe sections, the opposite ends of the pipe sections are provided with male projections 38 and female cavities 38ª respectively, such as conical in formation and with or without the application of a water and air proof adhesive, whereby the joints between the successive pipe sections are interlocked to preclude water and air leakage.

Where the product is desired for electric insulating purposes, the mold is shaped accordingly. The length of the molded pipe sections may be varied as desired by providing the mold of corresponding length.

By the aforesaid procedure, the bonding of the resulting molded cork mass is attained by the resins present in nature in the original cork. If it is desired to increase the resin content, additional resin is charged through the opening 4 of the drum 1, when charging in the cork granules or waste and for such purpose, rosin or other resins or oils closely similar to the natural cork resins are preferred. Such increased resin mass possesses increased waterproofing qualities.

My method is also applicable for forming gaskets of the resulting molded cork by providing molds having the outline of the desired gasket and cutting the molded mass into sheets or thicknesses corresponding to that of the desired gasket.

In a similar manner, pipe fittings, such as elbows, T's and the like may be formed in molds of corresponding shapes.

In Figs. 6, 7, 8 and 9 I have illustrated a set of molds and operating mechanism therefor, in conjunction with the plastic-rendering apparatus illustrated in Fig. 1 of the drawings, for the molding of elbows, T's and the like of plastic cork. Thus, as is indicated in Fig. 6, upon the delivery of plastic cork material through the discharge passage 19, into the posterior discharge passage 40, extending horizontally and corresponding to the anterior mold section 25 of the arrangement shown in Fig. 1 and similarly provided with the compacting plunger 26, the plastic mass 41, see Fig. 6, is forced by a plunger 26 through the outlet 42 into the cavity of a mold 43, brought by suitable mechanism (described more fully hereinafter) into register with the outlet 42, whereby the material is fed into the interior of such mold 43 and is impacted upon the reciprocation of the plunger 26. In this instance, the plunger 26, may be solid, that is to say, without any perforation such as the perforation 34 and no rod such as the rod 30 for guiding the plunger 26 or for forming a core in the impacted mass, is required.

Upon the delivery of the proper amount of compacted plastic cork into the mold 43, the succeeding mold is then brought into register with the outlet 42, and the plastic mass under similar condition impacted therein.

The mechanism of the set of molds may be of any suitable form. In Figs. 6, 7 and 8 I have illustrated the oppositely disposed guide plates 44, 45, extending vertically from and secured to a suitable bed 46. The molds 43 are duplicate, and arranged in side by side male and female relation between the vertical guides 44, 45 and the bed 46. The feeding of the molds 43 into register with the discharge mouth 42 is effected by means of the feed plate 47 operated by the pitman 48 connected with the cam 49, on the shaft 50, in suitable intermittent gearing relation with the aforesaid operating mechanism of the plunger 26 as is illustrated Fig. 1; the shaft 50 may be manually operated if so desired. Suitable means is provided for interconnecting the plunger 26 operating mechanism and the mold advancing and locating mechanism, to properly time the mold advancing mechanism and plastic cork feeding mechanism with one another.

Preferably locating means 51 is provided for determining and for holding in position each mold 43 in register with the mouth of the outlet 42 of the discharge passage 40; such locating means may comprise the centering pin 52, see Fig. 8, having a handle 53, the end 54 of the pin 52 being tapered for facilitating entry and release with respect to the opening 55 in a side of the mold 43.

A suitable form of interlocking male and female mold sections 43, 43ª, is shown in Fig. 10, and comprising a suitable cavity 56 on one face of the mold and a suitable projecting 58, see also Fig. 8, serving as a core for the cavity 57ª of the succeeding mold 43ª. Upon filling the cavity 56, 56ª of any pair of such molds 43, 43ª by delivery of the molded cork through the mouth 57, see also Fig. 9 of the mold, the plastic cork takes the shape of a half elbow 59 as is illustrated in Fig. 11, i. e., the formation determined by the conjoint position of the projection 58 serving as a core within the mold cavity 56.

For other shapes of molded cork fittings the molds are formed correspondingly and similarly fed in proper relation to the discharge outlet 42 of the drum.

Preferably, the molds 43, 43ª are subject to vacuum condition prior to being brought into register with the discharge outlet 42 of the drum 1, and a convenient arrangement therefor comprises the upper wall 60, see Fig. 8, making a closed run-way with the bed 46 and with the side plates 44, 45, the run-way being effectually sealed automatically at its ends by the snug fit of the sides of the molds with the bed 46, upper wall 60 and side walls 44, 45. The sealing effect may be further insured by spring-actuated gasket strips located in alignment with one another on the inner faces of the top 60, bed 46 and sides 44, 45, to form a virtual square collar, such collars being located in spaced relation within the run-way, and engaging the outer sides of the molds to further secure the sealing effect to provide the vacuum condition within the run-way.

To bring about the vacuum condition, the run-way is connected by suitable means with the exhaust pump 7, as by providing the slot 64 in the side wall 44, (see Figs. 6 and 7) over which extends the manifold 62 communicating through the pipe 63 with the suction line of the pump 7. The interior 61 of the manifold 62 communicates through the slot 64 with the inlet openings 57 of the molds 43ᵇ located anterior of the outlet 42, whereby the interior or cavities 56 of the molds prior to being brought into register with the outlet 42 and during the period of register are under vacuum condition.

By the procedure of my invention or subjecting the cork particles to the elevated temperature as above described in the drum 1 or equivalent, the cork particles are permitted free expansion, which is enhanced by the condition of the vacuum created by the pump 7, supplemented by the condensation by the condenser 8 of the moisture and volatile constituents of the cork.

Upon completion of the heating stage in the drum 1 or equivalent, the cork particles lose their tendency to expand and assume the property of contracting, which properly continues during the compression and molding stages, thereby facilitating the compression of the molded product, the progress of the molded product through the mold and the discharge of the molded product from the mold, thereby obviating the necessity of enlarging the final mold section or the discharge opening of the mold.

My invention is accordingly advantageous for the treatment of so-called "green" cork which by my heating treatment under the condition of free expansion eliminates all tendency of the "green" cork to expand while under the subsequent stages of molding and discharge.

A form of hollow block of the molded product 65 produced as herein above described illustrated in Fig. 5. Such block of hollow cork secures improved "cold" insulation by reason of the "dead" air space 66 as compared with cork board and is superiorly adapted for use in lieu of cork board. Thus, in walls, floors, ceilings or roofs of refrigerator plants, such hollow cork blocks are interposed between the brick or other building material, and are applicable in building construction generally. The improved hollow block secures increased insulation against heat and against transmission of sound.

Whereas I have described my invention by reference to specific forms thereof, it will be understood that many changes and modifications may be made without departing from the spirit of the invention, as defined by the appended claims.

I claim:

1. The process of forming molded products of cork, comprising subjecting granules of cork to an elevated temperature in a partial vacuum to render the cork and the resins natural in cork plastic and molding the same while in plastic form under vacuum condition.

2. The process of forming molded products of cork, comprising subjecting granules of cork to an elevated temperature in a vacuum to render the cork and the resins natural in cork plastic and molding the same while in plastic form and in substantial absence of oxidizing condition.

3. The process of producing molded composite cork bodies, comprising heating comminuted cork in a closed chamber at reduced pressure and transferring the heated material to a point where it is molded while excluding air from and preventing combustion of the heated material.

4. The process of forming molded products from cork particles, which comprises subjecting cork particles to an elevated temperature in a vacuum and in the presence of resinous material, to render the cork and the resins natural in cork plastic and molding the same while in plastic form and under vacuum condition.

5. The process of forming molded products from cork particles, which comprises subjecting cork particles to an elevated temperature in a vacuum and in the presence of resinous material, to render the cork and the resins natural in cork plastic and molding the cork while in plastic form under the condition of exclusion of air.

6. The process of producing molded cork bodies, comprising charging comminuted cork into a receiver, heating the material therein and meantime applying suction to the receiver to exhaust air and other developed gases, agitating the heated cork, discharging the resultant plastic mass into a molding zone and meantime excluding air therefrom, molding the material and discharging it from the molding zone.

7. The process which comprises charging particles of cork into a suitable receiver, subjecting the interior of the receiver to an elevated temperature and removing air therefrom, agitating the heated cork particles, rendering the cork and the resins natural in cork plastic, discharging the resulting plastic mass under heated condition and in substantial absence of air into a mold, removing the filled mold and supplying an additional mold to the point of discharge of the receiver and cooling the successively filled molds.

8. The process which comprises charging particles of cork into a suitable receiver, subjecting the interior of the receiver to an elevated temperature and in a partial vacuum, agitating the heated cork particles, rendering the cork and the resins natural in cork plastic, discharging the resulting plastic mass under heated condition and in a vacuum, into a mold, removing the filled mold and supplying an additional mold to the point of discharge of the receiver and cooling the successively filled molds.

9. The process which comprises charging particles of cork into a suitable receiver, subjecting the interior of the receiver to an elevated temperature and in a partial vacuum, agitating the heated cork particles, rendering the cork and the resins natural in cork plastic, discharging the resulting plastic mass under heated condition and in a vacuum, into a mold, removing the filled mold under vacuum condition and supplying an additional mold to the point of discharge of the receiver and cooling the successively filled molds.

10. The method of producing molded products of corks, which comprises withdrawing moisture inherent in cork particles by subjecting the cork particles to an elevated temperature under the condition of free expansion and low pressure and thereafter subjecting the heated cork particles to molding compression while excluding air from and preventing combustion thereof.

11. The method of producing molded products of cork, which comprises withdrawing moisture inherent in cork particles by subjecting the cork particles to an elevated temperature and agitation under the condition of free expansion and low pressure and thereafter subjecting the heated cork particles to molding compression while maintaining low pressure condition and preventing access of air to the material.

12. The method of producing molded products of cork, which comprises withdrawing moisture inherent in cork particles by subjecting the cork particles to an elevated temperature to render plastic the cork particles under the condition of free expansion and thereafter subjecting the heated cork particles to molding compression under the condition of a vacuum.

13. The method of producing molded products of cork, which comprises withdrawing moisture inherent in cork particles by subjecting the cork particles to an elevated temperature to render plastic the resins natural in the cork particles under the condition of free expansion and thereafter subjecting the heated cork particles to molding compression under the condition of a vacuum.

14. The method of producing molded products of cork, which comprises withdrawing moisture inherent in cork particles by subjecting the cork particles to an elevated temperature in a vacuum under the condition of free expansion and thereafter subjecting the heated cork particles to molding compression under the condition of a vacuum.

15. The method of producing molded products of cork, which comprises withdrawing moisture inherent in cork particles by subjecting the cork particles to an elevated temperature and agitation in a vacuum under the condition of free expansion and thereafter subjecting the heated cork particles to molding compression under the condition of a vacuum.

16. The method of producing molded products of cork, which comprises withdrawing moisture inherent in cork particles by subjecting the cork particles to an elevated temperature to render plastic the cork particles in a vacuum under the condition of free expansion and thereafter subjecting the heated cork particles to molding compression under the condition of a vacuum.

17. The method of producing molded products of cork, which comprises withdrawing moisture inherent in cork particles by subjecting the cork particles to an elevated temperature to render plastic the resins natural in the cork particles in a vacuum under the condition of free expansion and thereafter subjecting the heated cork particles to molding compression under the condition of a vacuum.

In testimony whereof I have signed this specification this 9th day of August 1923.

WILLIAM F. GRUPE.